May 19, 1925.
M. YOUNG
1,538,367
METHOD OF COLORING EGGS OR THE LIKE
Filed Jan. 28, 1924
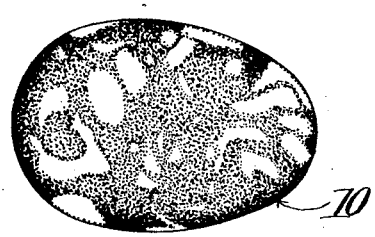
Fig. 1.
Fig. 2.
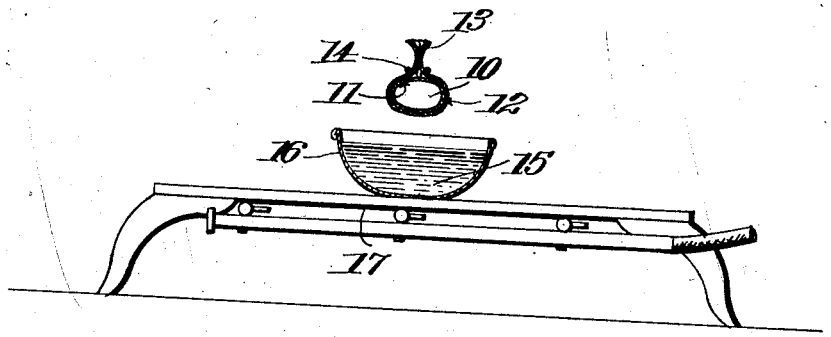

Patented May 19, 1925.

1,538,367

UNITED STATES PATENT OFFICE.

MARGARET YOUNG, OF DUBUQUE, IOWA.

METHOD OF COLORING EGGS OR THE LIKE.

Application filed January 28, 1924. Serial No. 689,144.

*To all whom it may concern:*

Be it known that I, MARGARET YOUNG, a citizen of the United States, residing at Dubuque, in the county of Dubuque and State of Iowa, have invented certain new and useful Improvements in Methods of Coloring Eggs or the like, of which the following is a specification.

This invention relates to a process or method of dyeing or coloring the eggs of poultry, birds and the like as for Eastertime use.

One prime aim is to produce a novel method which enables a marble-like effect or various shades of a color to be imparted to the shell of the egg through a single immersion in or treatment by liquid dye or coloring agent of a single shade or color.

A second object is to provide a process wherein each egg is covered or enclosed by means contiguous with its shell and which affects differently at portions thereof, a liquid dye or coloring agent capable of permeating the same so as to vary the shades of the color at multitudinous points on the shell of the egg to give a novel, artistic, marble-like effect.

Another object is to provide a process wherein the foregoing objects as well as the sole coloring or dyeing of the shells of the eggs, if desired, may be effected essentially through the use of vegetable tissue and particularly onion skins or peelings.

Additional objects and advantages will become apparent as the description progresses with relation to the accompanying drawing but it is to be understood that various changes may be resorted to within the spirit and scope of the invention and particularly the claims hereto appended.

In said drawing:

Figure 1 is a view in side elevation representing an egg dyed or colored in accordance with the present invention, and Figure 2 is a view partly in side elevation and partly in vertical section suggesting the practice of my new method or process.

In carrying out the invention, a poultry egg, bird egg, or the like as designated 10, in a raw condition or partly cooked, as preferred, but with the shell unbroken, has vegetable tissue, preferably onion (bulb of the albium cepa plant) skins or peelings 11, folded if desired, arranged contiguous with and completely covering its shell and held in place about the shell by a binder such as a sheet of porous, colorless fabric material 12 which completely envelopes the peelings and egg and has its edge portions gathered at 13 and fastened at the gather by a string or the like at 14. The binder is fastened so taut in the relation described and shown, that liquid cannot reach the shell of the egg, practically speaking, except it pass through the binder 12 and peelings 11. Said onion peelings initially are preferably substantially dry so as to be free of excess natural juice. The peelings 11 may be initially moistened as with water so that they will adhere to and remain in place about the egg. Said egg covered as described and grasped by a hand of the dyer at the gather 13 is lowered and immersed in a liquid bath 15 contained in a suitable vessel 16 which may be a cooking utensil and disposed on a stove 17 adapted to heat it. Said liquid is preferably water in which any known or color of dye, for instance the commercial Easter egg dyes now on the market, may be dissolved to form a coloring agent of solid color. The liquid incidental to solution of the dye is preferably heated and in fact may boil for that purpose and may be boiling when the egg is disposed or immersed therein and continue to boil while the eggs remain therein, especially if the egg is to be cooked, either wholly or partially while being dyed or colored as is usually the case. The egg should remain in the coloring agent a sufficient length of time to enable the coloring agent to permeate the binder 12 and onion peelings 13 to reach the shell. Later the egg is removed from the coloring agent and released from the binder and onion peelings and permitted to dry so as to serve as an Easter or ornamental egg. If desired, the shell of the egg may thereafter be varnished or otherwise finished.

An egg dyed or colored according to the present method or process is marble-like in appearance since it has various shades of substantially the same or solid color at multitudinous points about its shell as suggested by the stippling in Figure 1, and in contrast to the single shade or solid color which results when an egg is dipped directly in a liquid dye or coloring agent. This result is probably due to the fact that the dye or coloring agent permeates portions of the tissue or onion peeling differently, being affected chemically by the natural matter of the onion peeling, and such peeling probably precipitating and permitting different quantities of the solid matter of the dye or coloring agent to permeate it with the liquid at different locations.

I have also found that the egg tightly bound by the onion skin 11 and binder 12 may be dipped into pure water, preferably boiling, which will cook the egg and cause a yellow color from the onion skin or peelings to be transferred or imparted to the shell of the egg, but without variation as to shade or color.

I claim as my invention:

1. The method of coloring consisting in subjecting the article to the action of a coloring fluid passed through a medium affecting it differently at different portions of the medium.

2. The method of coloring an egg or the like consisting in subjecting its shell in contact with an onion peeling to the action of a liquid.

3. The method of coloring an egg or the like consisting in subjecting its shell to the action of a liquid in permeable relation with an onion peeling.

4. The method of coloring an egg or the like consisting in subjecting its shell to the action of a liquid passed through an onion peeling.

5. The method of coloring an egg or the like consisting in covering the article with substantially dry onion peelings in contact with its shell, and in subjecting the peelings to the action of a liquid designed to permeate the same and engage the said shell.

6. The method of coloring an egg or the like consisting in subjecting the article to the action of a coloring fluid passed through an onion peeling.

7. The method of coloring an egg or the like consisting in arranging onion peelings about the same to substantially necessitate passage of a fluid through said peelings to reach the shell of the egg, and in applying a dyeing fluid to the exterior of the peelings for absorption thereby and transfer to the said shell.

8. The method of coloring an egg or the like consisting in arranging onion peelings about the same and securing them taut by a binder, to substantially necessitate passage of a liquid through said peelings to reach the shell of the egg, and in immersing the egg, onion peelings and binder in a heated dyeing liquid.

9. The method of coloring an egg or the like consisting in placing a medium about the same moistened to adhere thereto, and in subjecting the medium to the action of a liquid to effect the coloring.

In testimony whereof I have affixed my signature.

MARGARET YOUNG.